(12) United States Patent
McClure et al.

(10) Patent No.: US 7,401,849 B2
(45) Date of Patent: Jul. 22, 2008

(54) TOWER STRUCTURE SUPPORTING BED ON FRAME

(75) Inventors: Kerry S. McClure, Dublin, OH (US); Yaniv Rock, Dublin, OH (US); Nick A. Massaro, Dublin, OH (US); David M. Edwards, Marysville, OH (US); Robb L. Augustine, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 11/272,281

(22) Filed: Nov. 10, 2005

(65) Prior Publication Data
US 2006/0119135 A1 Jun. 8, 2006

Related U.S. Application Data

(60) Provisional application No. 60/627,425, filed on Nov. 12, 2004.

(51) Int. Cl.
*B60R 27/00* (2006.01)
(52) U.S. Cl. ...................................... 296/204
(58) Field of Classification Search ............. 296/184.1, 296/203.01, 203.04, 204, 205
See application file for complete search history.

(56) References Cited

U.S. PATENT DOCUMENTS

| | | | |
|---|---|---|---|
| 4,379,545 | A | 4/1983 | Gray et al. |
| 4,526,418 | A | 7/1985 | Martin |
| 4,582,333 | A | 4/1986 | Doering |
| 4,634,168 | A | 1/1987 | Fuchs et al. |
| 4,729,156 | A | 3/1988 | Norris, Jr. et al. |
| 4,752,098 | A | 6/1988 | Shock |
| 4,819,980 | A | 4/1989 | Sakata et al. |
| 5,219,439 | A | 6/1993 | Moore et al. |
| 5,249,834 | A | 10/1993 | Johnson et al. |
| 5,729,463 | A | 3/1998 | Koenig et al. |
| 6,015,176 | A | 1/2000 | Egan |
| 6,206,459 | B1 | 3/2001 | Kim |
| 6,328,366 | B1 | 12/2001 | Foster et al. |
| 6,416,102 | B1 | 7/2002 | Howard |
| 6,648,400 | B2 | 11/2003 | Takahashi et al. |
| 6,648,401 | B2 | 11/2003 | Behnke et al. |
| 2003/0001409 | A1 | 1/2003 | Semple et al. |

*Primary Examiner*—Lori L Lyjak
(74) *Attorney, Agent, or Firm*—Mark E. Duell; Fay Sharpe LLP

(57) ABSTRACT

A vehicle frame includes a pair of spaced frame rails and at least one cross member connecting the frame rails. A tower structure is on one of the spaced frame rails for supporting a floor of a load-carrying bed spaced above the frame rails.

26 Claims, 5 Drawing Sheets

TOWER STRUCTURE SUPPORTING BED ON FRAME

This application claims priority of Provisional Patent Application Ser. No. 60/627,425, filed Nov. 12, 2004, entitled "Tower Structure Supporting Bed on Frame".

BACKGROUND

The present disclosure relates to a vehicle frame and, more particularly, to a frame subcomponent for supporting a vehicle's load-carrying bed on frame rails the vehicle's frame. In one embodiment, the frame subcomponent is a unibody tower structure disposed on an adjacent frame rail supporting the vehicle's load carrying bed thereabove and will be described with particular reference thereto. However, it is to be appreciated that the frame subcomponent could relate to other similar environments and applications.

Frames on pickup trucks and like vehicles often include a pair of spaced frame rails extending along the length of the vehicle. Cross members are used to connect the spaced frame rails and, together with the frame rails, provide a rigid ladder-like frame upon which a cab structure and a load-carrying bed structure can be mounted. Typically, the frame consisting of the frame rails and cross members is subassembled independently of the cab structure and the load-carrying bed structure. Likewise, the cab and load carrying-bed structures are subassembled separately and independently of one another. Once these components are subassembled, the cab structure and the bed structure, which are sometimes together referred to as the vehicle body, are mounted to the frame.

Conventional bed structures are often open-box structures including a rectangular bed floor, sidewalls extending upward from three of four edges of the bed floor and an openable tailgate extending along the remaining edge of the bed floor. When mounted to a ladder-like vehicle frame, the tailgate is oriented at one end of the frame rails opposite the cab structure. The bed floor is typically positioned directly adjacent and mounted to the frame rails. Thus, the height of the frame rails is approximately the same as the height of the bed floor.

Various types of body mounts are usually used for secured the vehicle body to the frame. Often the body mounts include some resilient material for absorbing vibrations and loads that are otherwise transferred from the vehicle frame to the vehicle body. Though these types of body mounts often slightly space the vehicle body from the vehicle frame, the vehicle body can still be characterized as being directly adjacent and directly mounted to the frame rails of the vehicle frame. Thus, body mounts can slightly space a bed floor from the frame rails, but the floor is still closely adjacent and, via the body mounts, directly mounted to the frame rails. Moreover, the height of the frame rails and, particularly, tops of the frames rails is approximately the same as the height of the bed floor.

BRIEF SUMMARY

According to one aspect, a vehicle frame is provided. More particularly, in accordance with this aspect, the vehicle frame includes a pair of spaced frame rails and at least one cross member connecting the frame rails. A tower structure is on one of the spaced frame rails for supporting a floor of a load-carrying bed spaced above the frame rails.

According to another aspect, a vehicle frame assembly of a vehicle having a load-carrying bed is provided. More particularly, in accordance with this aspect, the vehicle frame includes first and second frame rails extending along a substantial portion of a longitudinal length of the vehicle. At least one cross member extends between the first and second frame rails. A side panel structure adjacent the first frame rail forms a side of the vehicle and a sidewall of the load-carrying bed. A tower structure connects the side panel structure and the first frame rail. The tower structure supports the load-carrying bed.

According to yet another aspect, a unibody frame in a vehicle having a load-carrying bed is provided. More particularly, in accordance with this aspect, the unibody frame includes a platform portion including first and second frame rails spaced apart from one another and extending along and adjacent sides of the vehicle and at least one cross member extending between and connecting the first and second frame rails. Principal body panels, including a side panel structure, connect to the platform portion. A tower structure connects the side panel structure and the platform portion. The tower structure supports a floor of the load-carrying bed and spaces the floor from the first frame rail.

According to still another aspect, a tower structure in a unibody vehicle frame is provided for supporting a load-carrying bed. More particularly, in accordance with this aspect, the tower structure includes a plurality of interconnected walls extending from a frame rail of the unibody vehicle frame toward the load-carrying bed. A top wall is supported by the plurality of interconnected walls for supporting a floor of the load-carrying bed. Flanges extend from the plurality of interconnected walls and the top wall. The flanges are welded to the frame rail and a side panel structure adjacent the frame rail to connect the frame rail to the side panel structure.

DETAILED DESCRIPTION

Figure 1:
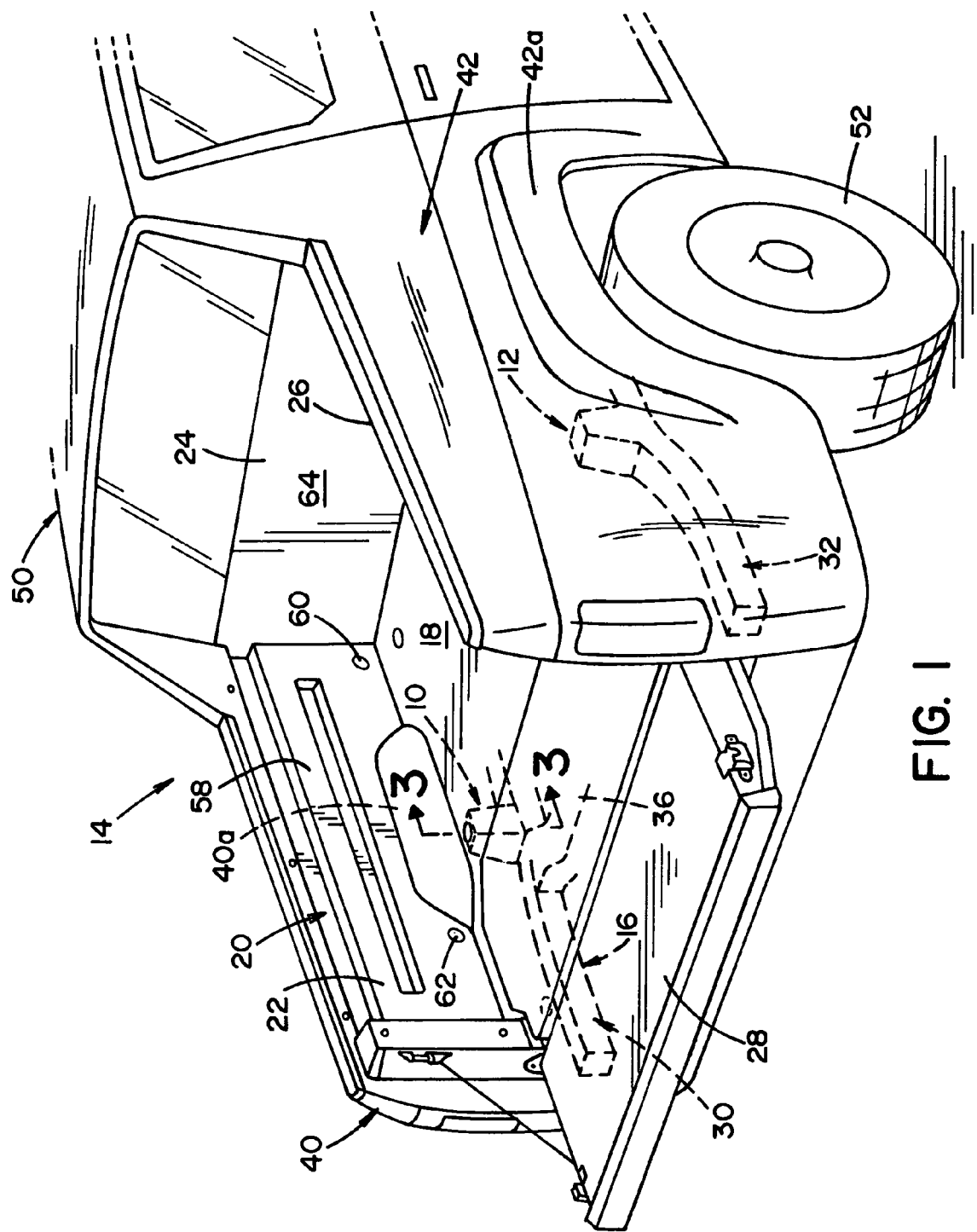
FIG. 1 is a perspective view of a vehicle having a frame (partially shown in hidden lines) including tower structures for supporting a load-carrying bed of the vehicle.

Referring now to the drawings wherein the showings are for purposes of illustrating one or more embodiments only and not for purposes of limiting the same, FIG. 1 shows tower structures 10,12 provided in a vehicle 14 as part of the vehicle's frame 16 for supporting a floor 18 of a load-carrying bed 20. In the illustrated embodiment, the vehicle is a sport utility truck (SUT), but it is to be appreciated by those skilled in the art that the vehicle 14 could alternately be any other type of vehicle having a bed, such as a pickup truck, utility truck or other vehicle. Generally, the bed 20 includes a plurality of walls 22,24,26 enclosing three sides thereof. A tailgate 28 is pivotally mounted adjacent the remaining open side and is selectively movable between a closed position and at least a fold-down position (shown in FIG. 1).

Figure 2:
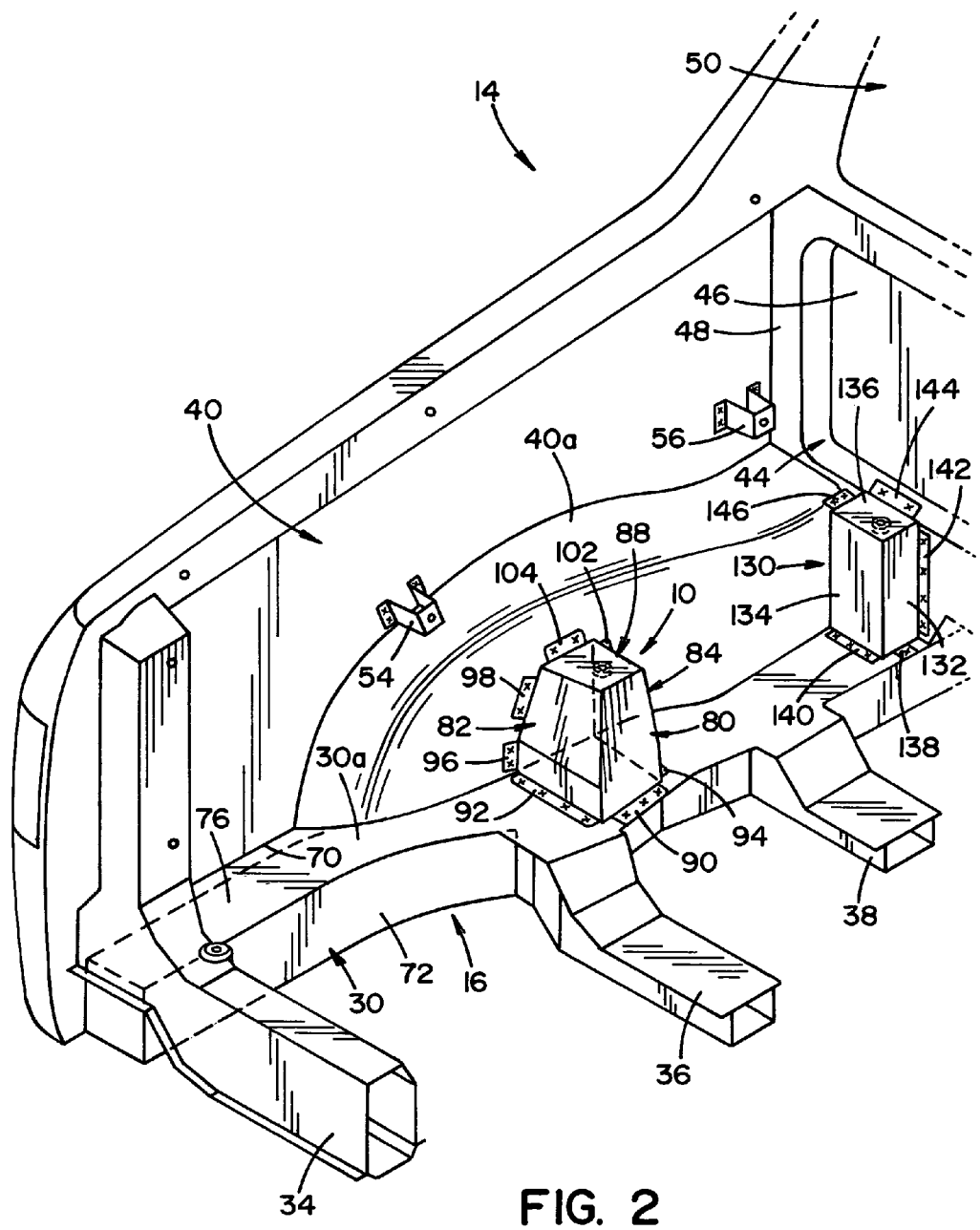
FIG. 2 is a perspective view of one of the tower structures and a portion of the vehicle frame surrounding the tower structure (shown with a floor and side panel members of the load-carrying bed removed).

With additional reference to FIG. 2, the vehicle frame 16 includes first and second frame rails 30,32 which extend along a substantial portion of a longitudinal length of the vehicle 14. The frame rails 30,32 are spaced apart and generally run or extend along and adjacent each side of the vehicle 14. A plurality of cross members 34,36,38 extend between and connect the frame rails 30,32. Rear cross member 34 extends along the open end of the bed 20 and supports the pivotally mounted tailgate 28. The frame rails 30,32 and the cross members 34 together form a platform portion of the vehicle frame 16.

In the illustrated embodiment, the frame 16 is a unibody frame wherein principal body panels of the vehicle 14 are combined with the platform portion 30-38 of the frame 16 to form a single, integrated frame assembly. The principal body panels and/or the platform portion can be formed of any suitable material, such as aluminum or steel. In the illustrated embodiment, the principal body panels include side panel structures 40,42 which form, respectively, first and second sides of the vehicle 14 and partially form, respectively, the first and second sidewalls 22,26 of the vehicle bed 20.

The principal body panels further include cross panel structure 44 formed of cross panel 46 and a surrounding rectangular frame structure 48. The cross panel structure 44 generally divides or separates the bed 20 from a cab portion 50 of the vehicle 14 which is disposed on the frame rails 30,32 forward of the load-carrying bed 20. The cross panel structure 44 is usually fixedly secured to the side panel structures 40,42 thereby further forming a part of the unibody frame 16. The single, integrated frame 16 is generally formed by welding the structures 40-44 and the platform portion 30-38 together.

The side panel structures 40,42 each include wheel well portions (only inner wheel well portion 40a of structure 40 and outer wheel well portion 42a of structure 42 are shown), which are recessed to accommodate wheels (only wheel 52 shown) of the vehicle 14. As shown, the first side panel structure 40 is positioned adjacent the first frame rail 30 and the second side panel structure 42 is positioned adjacent the second frame rail 32. As will be appreciated by those skilled in the art, the side panel structures 40,42 are generally similar to one another such that any description concerning one of the structures is also applicable to the other of the structures.

Bracket members 54,56 are secured to the side panel structure 40 adjacent the wheel well portion 40a via welding for supporting side panel member 58. More particularly, the bracket members 54,56 secure the side panel member 58 over the wheel well portion 40a. The side panel member 58 is disposed over wheel well portion 40a and further forms part of the bed sidewall 22. In the illustrated embodiment, the panel member 58 includes openings 60,62 in which recessed structures (not shown) each having a bolt throughhole are disposed for connecting to the bracket members 54,56 via a suitable fastener (not shown), such as a bolt, to secure the panel member 58 to the side panel structure 40. Although not shown in detail, another panel member 64 can be disposed over and connected to the cross panel structure 44.

Figure 3:
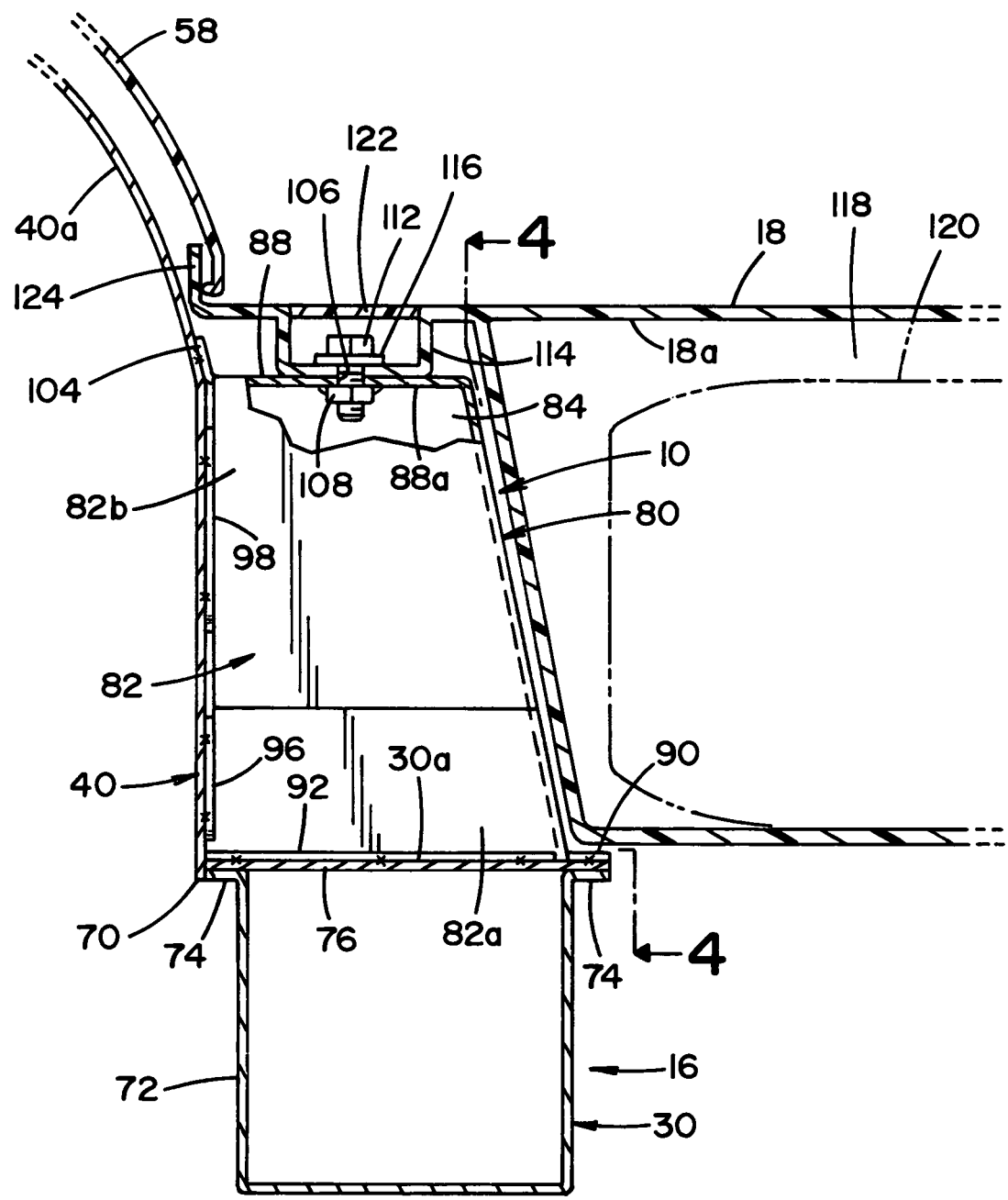
FIG. 3 is a cross-sectional view of the tower structure and vehicle frame of FIG. 2 taken along the line 3-3 of FIG. 1.

With continued reference to FIGS. 2 and 3, the frame rail 30 is positioned adjacent a lower edge 70 of the side panel structure 40 and extends along the wheel well portion 40a. The frame rail 30 is generally box-shaped and includes an upper surface 30a oriented approximately normal relative to the side panel structure 40. More particularly, with additional reference to FIG. 3, the frame rail 30 includes a U-shaped base member 72 having mounting flanges 74 disposed along an open side to which an upper planar member 76 is secured via welding. The upper surface 30a is disposed on the upper member 76 and is oriented approximately normal relative to the side panel structure 40.

The tower structure 10 is positioned on the upper surface 30a of the upper member 76 and the components 10,76 are secured together via welding. Likewise, the tower structure 10 and the side panel structure 40 are secured together via welding. Thus, by this arrangement the tower structure 10 connects the frame rail 30 (which is part of the platform portion of the frame) and the side panel structure 40, which is adjacent the frame rail 30, together and, as will be described in more detail below, the tower structure 10 support the floor 18 of the load-carrying bed a spaced distance above the frame rails 30,32. The second tower structure 12 is similarly positioned on the second frame rail 32 for further supporting the floor 18 of the load-carrying bed. The second tower 12 connects the second frame rail 32 and the second side panel structure 42. In most respects, as will be appreciated by those skilled in the art, the second tower structure 12 is like the tower structure 10 and only tower structure 10 will be described in further detail herein.

Figure 4:
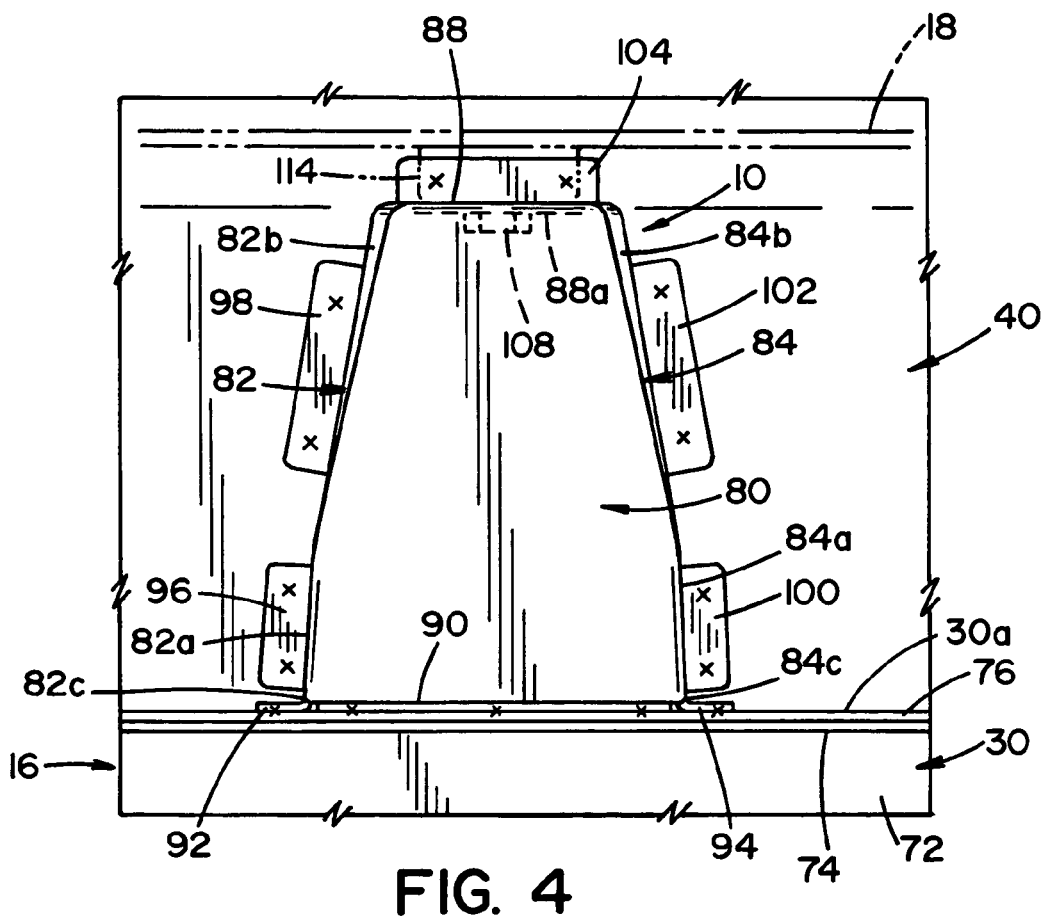
FIG. 4 is an elecational view of the tower structure and vehicle frame taken along the line 4-4 of FIG. 3.
Figure 5:
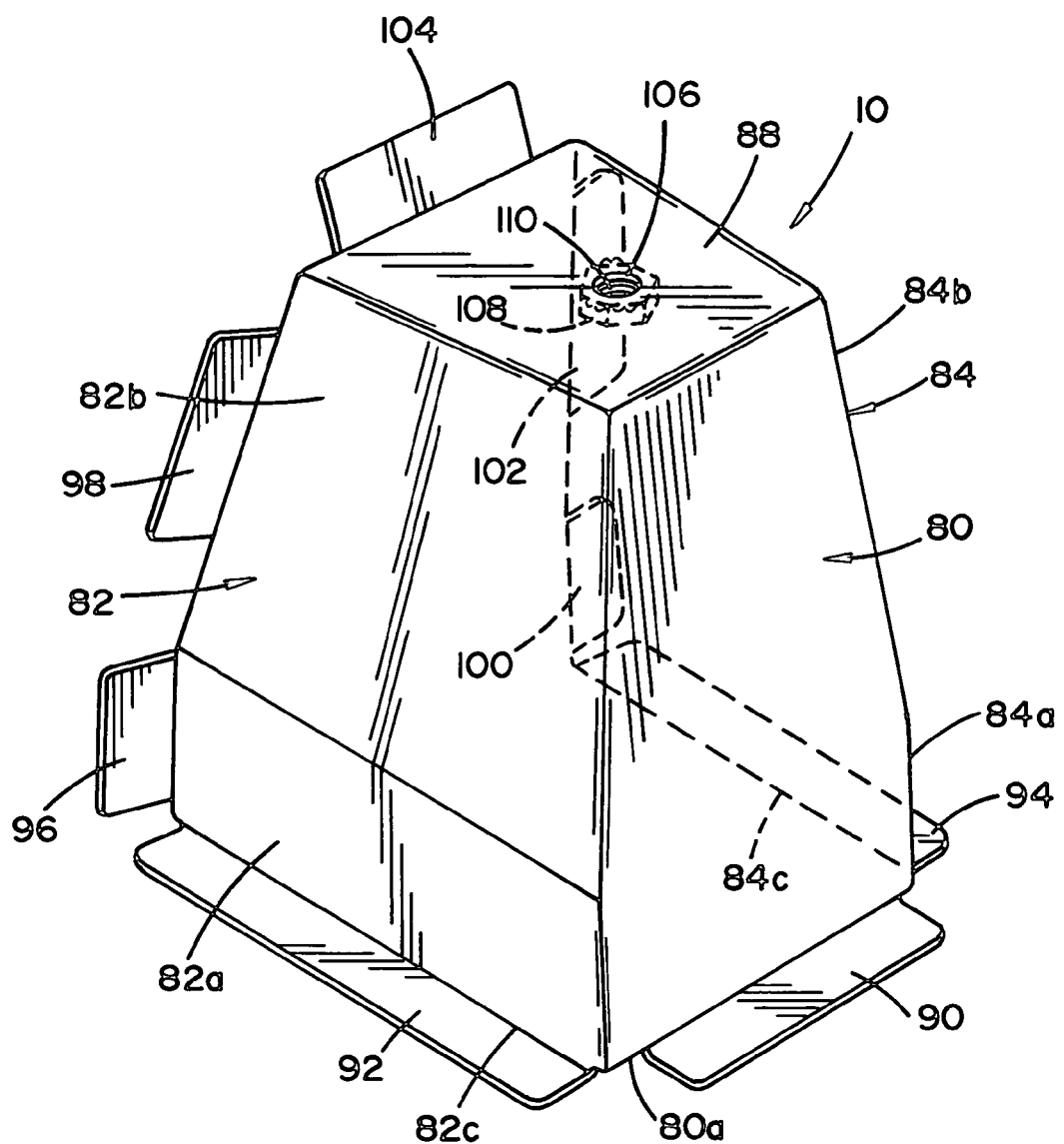
FIG. 5 is a perspective view the tower structure of FIG. 2.

With additional reference to FIGS. 4 and 5, the tower structure 10 shown in the illustrated embodiment includes a plurality of interconnected walls extending from the frame rail 30 toward the load-carrying bed 20. The plurality of interconnected walls includes a first wall 80 spaced from the side panel structure 40 and a pair of opposed, side walls 82,84, spaced apart from one another, extending from the first wall 80 to the side panel structure 40. The interconnected walls 80,82,84 extend from the first frame rail to adjacent the load-carrying bed floor 18.

A top wall 88, which is positioned adjacent the load-carrying bed floor 18, also extends from the first wall 80 to the side panel structure 40. The top wall 88 is supported by the interconnected walls 80,82,84. The side wall 82 includes a bottom portion 82a which extends upward at an angle generally perpendicular relative to the surface 30a and a top portion 82b which angles inwardly at an acute angle relative to the surface 30a. Similarly, the side wall 84 includes a bottom portion 84a which extends upward at an angle generally perpendicular relative to surface 30a and a top portion 84b which angles inwardly at an acute angle, generally matching the angle of the portion 82b, relative to surface 30a.

The wall 80 angles generally inwardly along its height relative to surface 30a at an acute angle relative to surface 30a. Top wall 88 is oriented in a position generally parallel to surface 30a and is spaced well above surface 30a. A plurality of flanges extends from the walls 80,82,84 for connecting the tower structure 10 to the frame rail 30 and, more particularly, the upper member 76 of the frame rail 30. The plurality of flanges includes a first flange 90 extending from bottom edge 80a of wall 80, a second flange 92 extending from bottom edge 82c of wall 82 and a third flange 94 extending from bottom edge 84c of wall 84. Each of the flanges 90,92,94 provides a substantially planar surface of significant surface area, which is aligned and generally parallel to the upper surface 30a, for welding the tower structure 10 to the frame rail 30. The flanges 90,92,94 can be collectively referred to as frame rail flanges.

A second plurality of flanges extends from the walls 82,84, 88 for connecting the tower structure 10 to the side panel structure 40. This plurality of flanges, which can be collectively referred to as side panel flanges, includes flange 96 extending from portion 82a, flange 98 extending from portion 82b, flange 100 extending from portion 84a, flange 102 extending from portion 84b and flange 104 extending from top wall 88. More particularly, the flanges 96,98,100,102,104 extend from respective edges of the portions 82a,82b,84a, 84b and the top wall 88 which are adjacent the side panel structure 40. Each of the flanges 96,98,100,102,104 provides a substantially planar surface of significant surface area, which is aligned and generally parallel to surface portions of the side panel structure 40 to which the flanges are attached, for welding the tower structure 10 to the side panel structure 40. The flanges 96,98,100,102,104 can be collectively referred to as side panel structure flanges.

The top wall 88 includes a securing means for securing the bed floor 18 to the tower structure 10. In the illustrated embodiment, the securing means includes a throughhole 106 defined in the wall 88 and a threaded member 108 having a threaded bore 110 secured to an underside 88a of wall 88. The threaded bore 110 is concentric with the throughhole 106 for receipt of a threaded fastener, such as bolt 112. The bolt 112 is threadedly received in the threaded member 108 to mount the floor 18 of the load carrying-bed 20 to the tower structure 10. More particularly, the floor 18 includes a mounting structure 114 depending from an underside 18a thereof. The mounting structure 114 allows the bolt 112 to retain the floor 18 to the tower structure 10. A washer 116 can be used in conjunction with the bolt 112.

In the illustrated embodiment, the bed floor 18 further includes storage structure 118 depending from the underside 18a that provides a storage area, which could be used to hold spare tire 120. Optionally, the floor 18 could additionally include caps, such as cap 122, for covering mounting structure 114 and allowing selective access to the mounting bolt 112. Further, the floor 18 can include an upturned flange 124 received between the side structure 40 and the panel member 58. The flange configuration prevents, or at least significantly reduces the likelihood, that rainwater will pass between the floor 18 and the side structure 40.

With specific reference back to FIG. 2, a forward tower structure 130 is mounted on the first frame rail 30 forward of the tower structure 10 for further supporting the floor 18 of the load-carrying bed 20 a spaced distance above the frame rail 30. The forward tower structure 130 is fixedly secured to, and thereby connects, the frame rail 30, the side panel structure 40 and the cross panel structure 44 via welding. In many respects, the forward tower structure 130 is like the tower structure 10. The forward tower structure 130 is positioned on the upper surface 30a and includes a plurality of interconnected walls extending from the frame rail 30 toward the load-carrying bed 20. The plurality of interconnected walls include first wall 132 spaced from the side panel structure 40 and sidewall 134 extending from the first wall 132 to the side panel structure 40. The first wall 132 abuts or is closely adjacent the cross panel structure 44. The sidewall 134 is spaced relative to the cross panel structure 44. The walls 132,134 extend from the first frame rail 30 to adjacent the load-carrying-bed floor 18. A top wall 136, which is positioned adjacent the load-carrying bed floor 18, also extends from the first wall 132 to the side panel structure 40. The top wall 136 is supported by the interconnected walls 132,134.

The walls 132,134,136 include a plurality of flanges for connecting the forward tower structure 130 to the frame 30, the cross panel structure 44 and the side panel structure 40. The plurality of flanges include flange 138 extending from a bottom edge of first wall 132 and flange 140 extending from a bottom edge of sidewall 134, both for connecting to the frame rail 30. The plurality of flanges further include flange 142 extending from a side edge of first wall 132 and flange 144 extending from a forward edge of top wall 136, both for connecting to the cross panel structure 44. Another of the flanges, flange 146, extends from a side edge of the top wall 136 for connecting to the side panel structure 40. The flanges 138-146 each provide a substantially planar surface of significant surface area for welding the forward tower structure 130 to, respectively, the frame rail 30, the side panel structure 40 and the cross panel structure 44. In the illustrated embodiment, the wall 136 includes a securing means for securing the bed floor 18 to the forward tower structure 130 that is the same as the securing means of top wall 88 of tower structure 10. Although not shown, a second forward tower structure can be provided on the frame 16 opposite first forward tower 130 for connecting the second frame rail 32, the second side panel structure 42 and the cross panel structure 44 and further supporting the load-carrying bed 20 a spaced distance from the frame rail 32.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle frame, comprising
a pair of spaced frame rails;
at least one cross member connecting said frame rails; and
a tower structure on one of said spaced frame rails for supporting a floor of a load-carrying bed spaced above said frame rails.

2. The vehicle frame of claim 1 further including a side panel structure adjacent one of said spaced frame rails, said side panel structure forming a side of the vehicle and one sidewall of said load-carrying bed.

3. The vehicle frame of claim 2 wherein said tower structure connects said side panel structure and said adjacent frame rail together.

4. The vehicle frame of claim 3 wherein said side panel structure, said frame rails, said at least one cross member and said tower structure are welded together to form a unibody frame.

5. The vehicle frame of claim 2 wherein said side panel structure includes a wheel well portion having a recess for accommodating a vehicle wheel.

6. The vehicle frame of claim 5 wherein said adjacent frame rail is positioned adjacent a lower edge of said side panel structure and extends along said wheel well portion.

7. The vehicle frame of claim 5 further including at least one bracket member secured to said side panel structure adjacent said wheel well portion, said at least one bracket securing a side panel member over said wheel well portion which further forms said one side well of said load-carrying bed.

8. The vehicle frame of claim 2 wherein said frame rail includes;
a U-shaped base member having flanges disposed along an open side thereof; and
an upper planar member secured to said flanges and having an upper surface to which said tower structure is mounted, said upper surface being oriented approximately normal relative to said side panel structure.

9. The vehicle frame of claim 1 further including a second tower structure on the other of said spaced frame rails for further supporting said floor of said load-carrying bed.

10. The vehicle frame of claim 1 further including a cross panel structure including a cross panel and a surrounding frame for separating said load-carrying bed from a cab portion disposed on said spaced frame rails forward of said load-carrying bed.

11. The vehicle frame of claim 10 further including a forward tower structure mounted on said one of said spaced frame rails for further supporting said floor of said load-carrying bed, said forward tower structure welded to said cross panel structure.

12. A vehicle frame assembly of a vehicle having a load-carrying bed, said vehicle frame assembly comprising:

first and second frame rails extending along a substantial portion of a longitudinal length of the vehicle;

at least one cross member extending between said first and second frame rails;

a side panel structure adjacent said first frame rail forming a side of the vehicle and a sidewall of the load-carrying bed; and a tower structure connecting said side panel structure and said first frame rail, said tower structure supporting the load-carrying bed.

13. The vehicle frame assembly of claim 11 wherein said tower structure spaces a floor of the load-carrying bed above said first frame rail.

14. The vehicle frame assembly of claim 11 wherein said frame rails, said at least one cross member, said side panel structure and said tower structure are members of a unibody frame.

15. The vehicle frame assembly of claim 11 further including:

a second side panel structure adjacent said second frame rail forming a second side of the vehicle and a second sidewall of the load-carrying bed; and a second tower structure connecting said second side panel structure and said second sidewall, said second tower structure further supporting the load-carrying bed.

16. The vehicle frame assembly of claim 14 further including:

a cross panel structure separating the load-carrying bed from a cab portion disposed on said first and second frame rails forward of the load-carrying bed;

a first forward tower structure connecting said first frame rail, said side panel structure and said cross panel structure; and a second forward tower structure connecting said second frame rail, said second side panel structure and said cross panel structure.

17. The vehicle frame assembly of claim 12 wherein said tower structure includes:

a first wall spaced from said side panel structure; and opposed side walls which are spaced apart from one another extend from said first side wall to said side panel structure, at least one of said first wall and said opposed side walls extending between said first frame rail and the load-carrying bed.

18. The vehicle frame assembly of claim 17 further including a top wall extending from said first wall to said side panel structure, said top wall spaced from said first frame rail and positioned adjacent the load-carrying bed.

19. The vehicle frame assembly of claim 18 wherein said top wall includes a threaded member to which a floor of the load-carrying bed is mounted by a threaded fastener.

20. The vehicle frame assembly of claim 17 further including at least one flange being one of:

(i) welded to said frame rail and extending from one of said first wall and said opposed side walls; and (ii) welded to said side panel structure and extending from one of said opposed side walls and a top wall extending from said first wall to said side panel structure, said top wall spaced from said first frame rail and positioned adjacent the load-carrying bed.

21. The vehicle frame assembly of claim 20 further including:

a plurality of flanges extending from said first wall and said opposed side walls for welding to said frame rail; and a second plurality of flanges extending from opposed side walls and said top wall for welding to said side panel structure.

22. A unibody frame in a vehicle having a load-carrying bed, comprising:

a platform portion including first and second frame rails spaced apart from one another and extending along and adjacent sides of the vehicle and at least one cross member extending between and connecting said first and second frame rails;

principal body panels connected to said platform portion, said principal body panels including a side panel structure; and a tower structure connecting said side panel structure and said platform portion, said tower structure supporting a floor of the load-carrying bed and spacing said floor from said first frame rail.

23. The unibody frame of claim 22 wherein said tower structure connects said first frame rail and said side panel structure.

24. The unibody frame of claim 22 wherein said at least one cross member includes a rear cross member extending along an open end of the load-carrying bed for supporting a pivotally mounted tailgate.

25. The unibody frame of claim 22 further including:

a cross panel structure dividing the load-carrying bed from a cab portion on said platform portion forward of the load-carrying bed;

a forward tower structure connecting said platform portion, said side panel structure and said cross panel structure.

26. A tower structure in a unibody vehicle frame for supporting a load-carrying bed, said tower structure comprising:

a plurality of interconnected walls extending from a frame rail of the unibody vehicle frame toward the load-carrying bed;

a top wall supported by said plurality of interconnected walls for supporting a floor of the load-carrying bed; and flanges extending from said plurality of interconnected walls and said top wall, said flanges welded to said frame rail and a side panel structure adjacent said frame rail to connect said frame rail to said side panel structure.

* * * * *